United States Patent [19]

Attikiouzel

[11] Patent Number: 4,911,256
[45] Date of Patent: Mar. 27, 1990

[54] DIETETIC MEASUREMENT APPARATUS

[75] Inventor: Yianni Attikiouzel, City Beach, Australia

[73] Assignee: Sentron Limited, Western Australia, Australia

[21] Appl. No.: 23,863

[22] PCT Filed: Jun. 6, 1986

[86] PCT No.: PCT/AU86/00166
§ 371 Date: Feb. 2, 1987
§ 102(e) Date: Feb. 2, 1987

[87] PCT Pub. No.: WO86/07447
PCT Pub. Date: Dec. 18, 1986

[30] Foreign Application Priority Data

Jun. 7, 1985 [AU] Australia ............... PH0951

[51] Int. Cl.$^4$ ............... G01G 23/22; G01G 23/14; G06F 15/42
[52] U.S. Cl. ............... 177/25.16; 177/165; 364/413.29; 364/709.03
[58] Field of Search ............... 177/25.16, 165; 364/413, 567, 709

[56] References Cited

U.S. PATENT DOCUMENTS 3,387,676 6/1968 Porter ............... 177/25.16
4,321,674 3/1982 Krames et al. ............... 364/413
4,575,804 3/1986 Ratcliff ............... 364/413 X

FOREIGN PATENT DOCUMENTS 17256 1/1985 Australia.
2492976 4/1982 France ............... 177/145
136914 10/1980 Japan.
60223 4/1982 Japan.
60224 4/1982 Japan.

Primary Examiner—George H. Miller, Jr.
Attorney, Agent, or Firm—Reising, Ethington, Barnard, Perry & Milton

[57] ABSTRACT

A dietetic measurement apparatus (10) having computer means (30) having a controlling instruction means to provide a determination of basic integers for a mass of a food item weighed on a weighing means (32). The weighing means (32) provides a weighing signal, in the form of a logical periodic signal, to a central processor unit (34) of the computer means (30), which measures the frequency of the weighing signal and correlates the mass of the food item and the quantities of the nutrients. The nutrients comprise carbohydrate, calcium, cholesterol, fat, fibre, iron, protein, sodium and calorific content. Also a number of command keys (22a) are provided and include a ZERO key and a BOWL key to aid in weighing procedures.

12 Claims, 2 Drawing Sheets

DIETETIC MEASUREMENT APPARATUS

DESCRIPTION

The present invention relates to a dietetic measurement apparatus particularly envisaged for use in determining the weight and the quantities of nutrients in food items for the purposes of dietary planning and control.

FIELD OF THE INVENTION

In order to maintain a well balanced diet and to assist in following a preset diet it is common practice to weigh food items. However, such a diet, must be prepared with knowledge of the nutrient levels in the food items in the diet, such as calorific content, sodium, cholesterol and the like, and the bodily requirements of the dietor. It is therefore much preferred that a dietor be able to make his/her own determinations as to the nutrient levels in a food item to be eaten, whether or not it is allowed for in a preset diet. Such information is at least partly available in various tables of nutrient levels for food items. However, such tables must be consulted at length in order to obtain all of the desired information and must then be correlated with the mass of the food items.

It is generally known to provide a measuring apparatus to determine the mass of a food item and having means to determine various nutrient levels therefor, including, calorific content, carbohydrate content, sodium content and the like.

However, the use of such prior art measuring apparatus requires the knowledge of a code, such as, for example, a 3 digit code to identify a food item to be weighed and analysed as to its nutrient levels.

Furthermore, such prior art measuring apparatus generally are incapble of offsetting the mass of a container in weighing the container together with contents.

SUMMARY OF THE INVENTION

The present invention provides a dietetic measurement apparatus to efficiently and rapidly weigh a food item and to provide a determination of nutrient levels therefor by identifying the food item by its common name. In accordance with the present invention there is provided a dietetic measurement apparatus, characterised in that it comprises a computer means and a weighing means, the computer means comprising a central processor unit to which is connected a memory means and an input/output means, the input/output means being configured to send data from the central processor unit to a display means and to receive requests from the request means and to route such requests to the central processor unit, the weighing means providing a weighing signal to the central processor unit corresponding to the mass of an item being weighed, the memory means containing data corresponding to food items and their nutrient levels, the memory means also containing an instruction means for the central processor unit to correlate the weighing signal with data for a food item or items requested from the request means and providing a determination of the mass thereof to the display means.

BRIEF DESCRIPTION OF THE DRAWINGS

The present invention will now be described by way of example with reference to the accompanying drawings in which.

DESCRIPTION OF THE INVENTION

Figure 1:
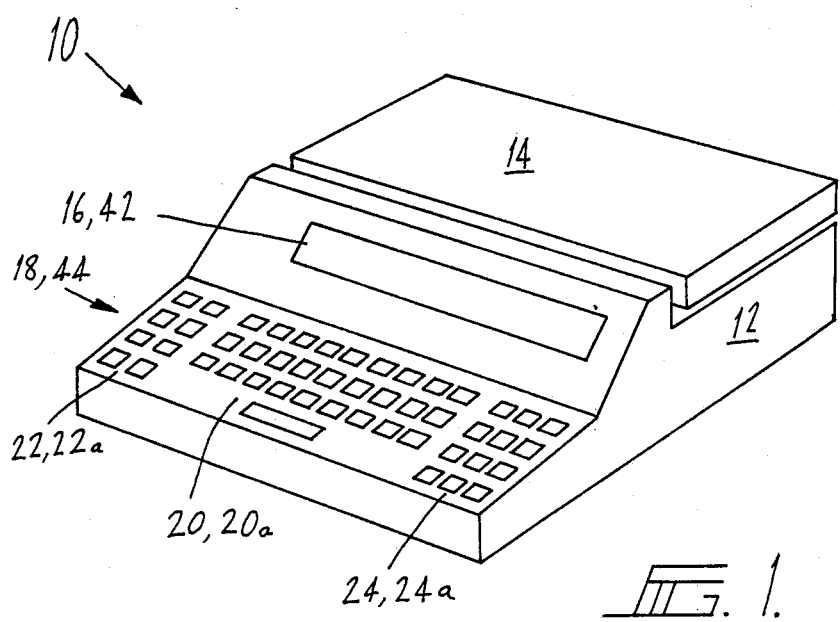
FIG. 1 is an upper perspective view of a dietetic measurement apparatus in accordance with the present invention.

In FIG. 1, there is shown a dietetic measurement apparatus 10 having a housing 12 having a substantially horizontally disposed platter 14. The platter 14 is supported by a load cell (not shown) of conventional type. The housing 12 also comprises a transparent panel 16 located in plain view of an operator and arranged to correspond with a display means as described hereinafter. The housing 12 further comprises a keyboard panel 18 located for convenient use of the operator such as, for example, in the form of a panel to cover a touch sensitive keboard and having printed and/or embossed on it indicia representative of keyboard key locations. The keyboard panel 18 preferably comprises alphabetic indicia 20, command indicia 22 and a nutrient level indicia 24. A touch sensitive keyboard has been found to be most beneficial in the context of the present invention since the surface thereof is continuous and not prone to damage by liquids or particulate materials that may come into contact with it.

Figure 2:
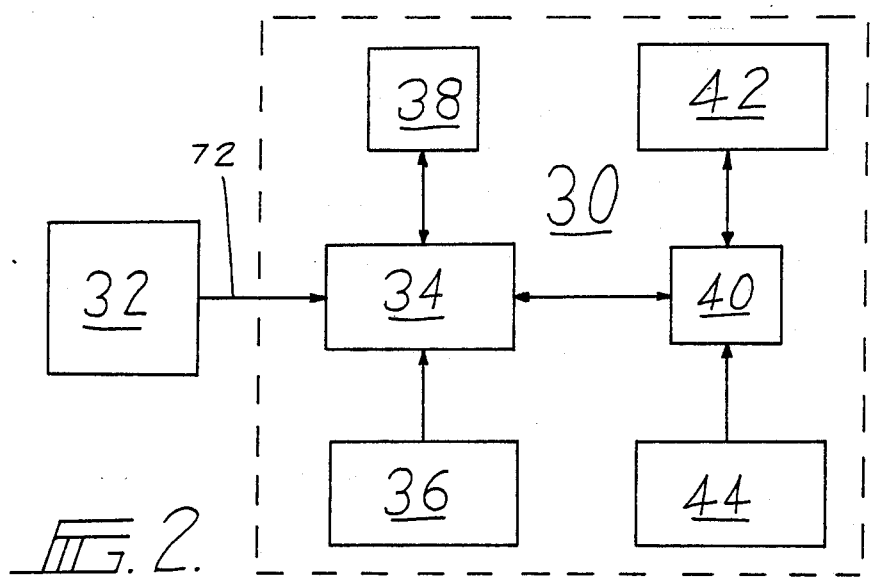
FIG. 2 is block diagram of the dietetic measurement apparatus of FIG. 1.

The dietetic measurement apparatus 10 also comprises a computer means 30 and a weighing means 32, as shown in FIG. 2, and each of which is located within the housing 12.

The computer means 30 comprises central processor unit (CPU) 34 to which is connected a memory means in the form of a read only memory (ROM) 36 and a random access memory (RAM) 38.

An input/output means (I/O) 40 is also connected to the CPU 34 and is configured to send data from the CPU 34 to a display means 42. The I/O means 40 is also configured to receive requests from a request means 44 and to route such requests to the CPU 34.

The display means 42 is located within the housing 12 behind the transparent panel 16.

The request means 44 comprises an alphabetic request means 20a, a command request means 22a and a nutrient level request means 24a all of which are located within the housing 12 and behind the coresponding alphabetic indicia 20, command request indicia 22 and nutrient level indicia 24, respectively as described hereinafter. In the present embodiment the CPU 34, RAM 38 and I/O means 40 are integrated into a microprocessor chip, such as for example, one of the Zilog Z8 series of microprocessor chips.

The RAM 38 comprises an instruction means to direct the operation of the CPU 34 in response to a request entered by an operator via the request means 44. The ROM 36 also comprises data relating to a vocabulary of food items and their respective nutrient levels.

It is envisaged that the details of nutrient levels comprise details of per unit quantities of any one or more of carbohydrate, calcium, cholesterol, fat, fibre, iron, protein, sodium, calorific content and the like.

Preferably, data relating to the food items and their corresponding nutrient levels are stored in the ROM 36 in alphabetical order so as to aid in search procedures described hereinafter.

Preferably, the ROM 36 also comprises data relating to the quantities of total nutrient levels contained in recipes, (for example Beef Stroganoff), which data may be viewed on the display means 42 by a sequence of keys from the request means 44, such as, for example, entry of the name of the recipe.

The RAM 36 is intended to store transient data generated during operation of the dietetic measurement apparatus 10 of the present invention.

The alphabetic request means 20a of the request means 44 comprises a conventional alphabetic keyboard and is provided to allow a user to make a request of a food item or the like to the CPU 34 via the I/O means 40 in control of an instruction means, as described hereinafter.

The command request means 22a of the request means 44 comprises a plurality of user operable command keys including command keys conveniently labelled and referred to as CLEAR, ADD, DELETE, ZERO, BOWL, SCROLL DOWN, FIND and SCROLL UP, the function of which is described hereinafter.

Figure 3:
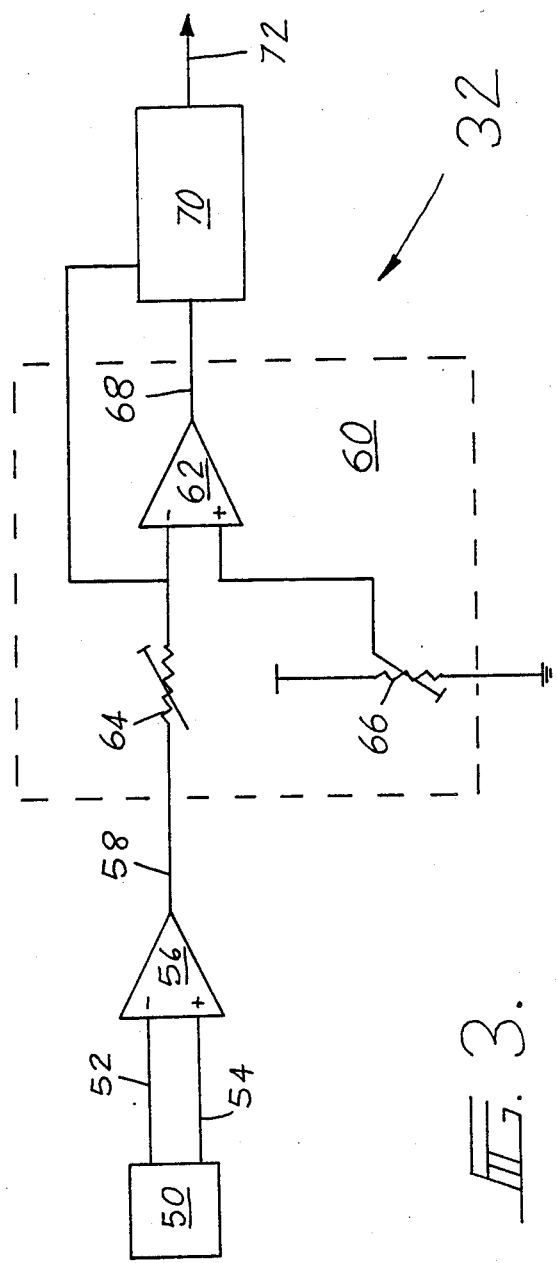
FIG. 3 is a schematic circuit diagram of a weighing means of the dietetic measurement apparatus of FIG. 2.

The nutrient level request means 24a of the request means 44 comprise a plurality of user operable keys corresponding respectively to the details of nutrient levels in respect of food items stored in the ROM 36 as described hereinabove together with keys to request mass in grams and in ounces and calorific content in calories and joules. The weighing means 32 in the present embodiment of the invention comprises a strain bridge 50, as shown in FIG. 3, in the form of a load cell. The load cell containing the strain gauge bridge 50 is fixed at one point to the housing 12, so as to have a stationary reference point, and at another point to the platter 14. The strain gauge bridge 50 is orientated to produce a differential output voltage at outputs 52 and 54 dependant upon the vertical downward force on the platter 14. The vertical downward force of the platter 14 is dependant upon the weight of a mass in the form of an object such as a food item and/or container placed thereon and thus the differential ouput voltage is dependant on the mass. The outputs 52 and 54 are connected to inputs of a pre-amplifier 56 in order to increase the strength of the differential output voltage signal. Preferably, the preamplifier 56 comprises a higher stability operational amplifier, such as, for example, a chopper stabilized operational amplifier.

The pre-amplifier 56 also comprises an output 58 connected to a signal level calibration amplifier 60 comprising an operational amplifier 62 preferably having a very high input impedance. The calibration amplifier 60 comprises variable resistors 64 and 66. The variable resistor 64 is connected between the output 58 and an inverting input of the operational amplifier 62. The variable resistor 66 is connected to a non inverting input of the operational amplifier 62.

The calibration amplifier 60 has an output 68 connected to a conventional voltage to frequency (V-F) converter 70 having a logical output 72. The V-F converter 70 is configured in conventional manner.

The logical output 72 is connected to a frequency input of the CPU 34 which is configured to determine the frequency thereof. The measured frequency, is dependant upon the voltage at the output 68 and hence on the differential output voltage from the strain gauge bridge 50 and thus on the mass of an object upon the platter 14. The variable resistor 64 is adjusted such as, for example, to produce a frequency change at the output 72 of say 16 Hz per gram of weighed mass. The variable resistor 66 is adjusted, such as, for example, to produce a base (no load) frequency of about 5 kHz at the output 72. It is envisaged that the V-F converter 70 arrangement described hereinabove could be replaced by an analogue to digital (A/D) converter (not shown). However, it has been discovered that a V-F converter 70 arrangement allows for easier calibration of the strain gauge bridge 50 and requires much simpler connection to the CPU 34 and therefore is preferred.

It is envisaged that further nutrient levels for the food items be accessible from the ROM 36 by use of a further sequence of keys from the request means 44.

It is also envisaged that means be provided to allow for the determination of the quantities of the nutrients for a hypothetical mass of a food item.

In use, the dietetic measurement apparatus 10 of the present invention provides details concerning the quantity of nutrients of a requested food item for a weighed mass of the food item.

Accordingly, the apparatus 10 may be employed to weigh a food item to be consumed and to assist in planning diets having a desired level of certain nutrient levels and to provide a measure of the basic integer and mass of a food item to be consumed and to assist a dieter, such as, for example, a diabetic, in avoiding foods with excessive quantities of certain undesirable nutrients, such as carbohydrates including sugar.

The apparatus 10 may also be used as a reference for the quantities of nutrients in certain recipes stored in the ROM 36.

Where the food item to be weighed is most conveniently stored in a container the operator may first place the container upon the platter 14. Then by pressing the key of the command request means 22a labelled ZERO the command request means 22a directs the CPU 34 to disregard the mass of the container. The food item may then be placed in the container and its mass determined.

Where it is desired to determine the quantity of nutrients for a food item or items an operator must first press the key of the command request means 22a labelled FIND. The command request means 22a then commands the CPU 34 to enter into a search mode under control of the instructions means. The CPU 34 then prompts the operator to identify the food item to be searched by displaying "ENTER ITEM" on the display means 42.

The search is conducted for an alphabetic search string entered by the operator into the alphabetic request means 20a. The alphabetic search string may be the first one or more letters of a desired food item or the entire name of the food item. For example, to search for "steak grilled" the operator may enter any of, say, "s" or "steak" or "grilled" or "steak grilled".

The end of the alphabetic search string is designated by pressing one of the keys of the command request means 22a labelled either SCROLL UP or SCROLL DOWN. Then the search procedure is commenced by the instruction means by searching through the ROM 36 for food items beginning with the alphabetic search string inserted by the operator. If such a food item is found the CPU 34 correlates the mass of the food item on the platter 14 with the per unit quantities of nutrients therefor, determines the amount of nutrients in the food item present and displays the food item name and one of its nutrient levels or mass on the display means 42.

Where are abbreviated alphabetic search string is used and the food item found is not that desired the operator may use the SCROLL UP and SCROLL DOWN keys to locate the next and previous food items respectively having the alphabetic string at the beginning of one of its words. Accordingly, the SCROLL UP and SCROLL DOWN keys direct the CPU 34 via the instruction means to continue the search for the next and previous food items satisfying the search string.

When the instruction means by use of the SCROLL UP or SCROLL DOWN keys has found all the food items having the search string at the start of their first word it then searches through the ROm 36 for any food items with the search string at the beginning of any subsequent words. Where it is desired to accumulate the masses and quantities of basic integers of a number of food items a first food item is identified by pressing the FIND key and placed upon the platter 14 as before. However, before placing a second food item onto the platter 14 the key of the command request means 22a labelled ADD is pressed. Then the command request means 22a directs the CPU 34 to add together the mass and all nutrient levels of the two food items and to store the results in the RAM 38 once the searched food item is identified and weighed. Such steps may be repeated for subsequent food items and an absolute total obtained.

Where one of the subsequent food items is to be stored in a container, such as, for example, orange juice, the container is placed on the platter 14 with the previously weighed food item and the key of the command request means 22a labelled BOWL is pressed. The command request means 22a then directs th CPU 34 to disregard the mass of the container whilst retaining the previously accumulated means and quantities of nutrients. The BOWL command thus allows a dieter to readily total all food items in a meal even where more than one of the food items must be placed in a container.

When the operator is entering the identity of a food item into the CPU 34 via the alphabetic request means 20a typographical errors may be removed by pressing the key of the command request means 22a labelled DELETE. Then the command request means 22a directs the CPU 34 to remove the previously entered alphabetic character and to confirm same by removing the last entered alphabetic character from the display means 42.

Similarly, the key of the command request means 22a labelled CLEAR may be pressed to direct the CPU 34 to remove all RAM data relating to a string of alphabetic characters entered via the alphabetic request means 20a and to clear the display means 42.

To weigh a food item an operator of the apparatus 10 places the food item on the platter 14. The weight of the food item then exerts an amount of force on the platter 14 dependant upon the weight of the food item. The force results in a differential voltage in the strain gauge bridge 50, which voltage produces a depending frequency at the output 72 as described hereinbefore. The frequency at the output 72 is measured by the CPU 34 and a corresponding mass is correlated. The correlated mass may then be displayed on the display means 42 via the I/O means 40. An operator may identify a food item to be weighed by pressing FIND and entering the common name thereof into the CPU 34 from the alphabetic request means 20a via the I/O and pressing the SCROLL UP or SCROLL DOWN key. Then the corresponding mass of the food item is also correlated with the per unit quantities of the nutrients for the food item to determine the quantity of the nutrients for the actual mass of food item being weighed. The correlated quantities are then stored in the RAM 38 for later retrieval.

Where the food item has been identified via the alphabetic request means 20a the operator may press any of the keys of the nutrient level request means 24a to display the quantity of one of the nutrients present in the food item. For example, the user may press a key of the nutrient level request means 24a corresponding to the quantity of carbohydrate in the food item weighed. The key activation is registered by the CPU 34 via the I/O means 40 as it scans the request means 44 for requests. The CPU 34, under control of the instruction means, then retrieves from the ROM 36 data relating to the quantity of the nutrients requested correslates the quantities with the actual mass present and displays it on the display means, such as, for example, "food item 40 carb".

Each of the above operations is termed, for the purposes of the present invention, a weighing sequence. The former is more particularly a mass weighing sequence, and the latter is more particularly a nutrient weighing sequence. When the operator has completed a weighing sequence the food item may be removed and the data stored in the RAM 38 may be cleared by pressing the key of the command request means 22a labelled ZERO.

Where the length of the food item name is too long to be located on the display means 42 in the area allocated the instruction means directs the display means 42 to truncate the food item name and then to shift the entire name one character to the left and insert the first of the truncated letters. The above process is continued until all the letters of the name have been displayed. It is envisaged that the apparatus 10 could be modified to provide volumetric meansurement of liquids and measurement of nutrient levels therefor.

It is envisaged that means could be provided to allow an operator to search for food items by their food group, such as, for example, FRUIT.

Modifications and variations such as would be apparent to a skilled addressee are deemed within the scope of the present invention.

I claim:

1. A dietetic measurement apparatus characterized in that it comprises computer means comprising a central processing unit, request means including alphabetic keyboard for allowing selection of food items by character string of the name of the food item, input/output means connected to the central processor unit for sending data from the central processor unit to a display means and for receiving requests from the request means and for routing such requests to the central processor unit, weighing means for providing a weighing signal to the central processor unit corresponding to the mass of an item being weighed, memory means connected to the central processor unit for containing data corresponding to food items and their nutrient levels and including instruction means for the central processor unit to correlate the weighing signal with data for a food item or items requested from the request means and providing a determination of the mass and the nutrient levels thereof to the display means, said request means including a scroll up and scroll down request key to direct the central processor unit via the instruction means to proceed and retreat, respectively, from data relating to a current food item in the memory means to data relating to an adjacent food item.

2. A dietetic measurement apparatus according to claim 1, characterised in that the request means comprises a zeroing request means to direct the central processor unit, via the instruction means of the memory means to offset the mass of the a container having a food item stored therein.

3. A dietetic measurement apparatus according to claim 2, characterised in that the request means comprises a BOWL request means to direct the central processor unit via the instructions means to offset the mass of a further container having a food item stored therein.

4. A dietetic measurement apparatus according to claim 2, in which the request means comprises bowl request means configured to direct the central processor means to disregard the mass of a container placed upon the platter subsequent to one or more previously placed containers which remain on the platter.

5. A dietetic measurement apparatus according to claim 2, in which the memory means comprises data corresponding to unit volumes or densities of food items and the request means comprises a further request means to direct the central processor unit to correlate the volume of the food item together with its nutrient levels.

6. A dietetic measurement apparatus according to claim 1, characterised in that the instructions means further directs the central processor means to correlate the weighing signal with data for a food item or items requested from the request means and providing a determination of quantity of nutrients therefor, the nutrients including anyone or more of carbohydrate, calcium, cholesterol, fat, fibre, iron, protein, sodium and calorific content.

7. A dietetic measurement apparatus according to claim 1, characterised in that the request means compries and ADD request means to direct the central processor unit via the instruction means to accumulate the masses and/or quantities of nutrients of food items requested from the request means in a weighing sequence.

8. A dietetic measurement apparatus according to claim 1, characterised in that the request means comprises a FIND request means to direct the central processor unit via the instruction means to find data in the memory means relating to a food item requested by the request means and to display some or all of the data on the display means.

9. A dietetic measurement apparatus according to claim 1, characterised in that the data in the memory means relating to each food item is arranged in alphabetical order.

10. A dietetic measurement apparatus according to claim 1, in which the request means comprises a zeroing request means to direct the central processor unit, by the instruction means of the memory means to offset the mass of a container having a food item stored therein, the display means being configured to truncate food item names which exceed a length reserved for such names to be placed, the display means being also configured to shift the entire name one character to the left and to insert a first of the truncated characters until all letters of the name are displayed on the display means.

11. A dietetic measurement apparatus comprising: weighing means having a platter attached upon a load cell for providing a weighing signal corresponding to the mass of an object being weighed upon the platter; computer means including memory means for containing data corresponding to food items including their unit masses and nutrient levels, a central processor unit connected to the memory means for executing requests and for receiving the weighing signal and storing same in the memory means, display means for displaying data output from the central processor unit, an alphanumeric keyboard for entering requests to the central processor unit, and input/output means for directing data between the central processor unit and the display means and the alphanumeric keyboard, respectively; and request means including zeroing request means for directing the central processor unit to reset the weighing signal stored in the memory means in order to disregard the mass of a first container placed upon the platter, find request means for directing the central processor unit to search for data in the memory means and for selecting food items by a character string located within he name of the food item such that the exact food name need not be requested, and add request means for directing the central processor to accumulate masses and nutrients levels for objects subsequently weighed in the weighing means, request means including scroll request means to direct the central processor unit to search for either an alphabetically preceding or succeeding food item by name, the scroll request means having a scroll down key to locate the alphabetically preceding food item name and a scroll up key to locate the alphabetically succeeding food item name.

12. A dietetic measurement apparatus comprising; display means; computer means including a central processor unit, request means including alphabetic keyboard for allowing selection of food item names by character string less than the number of characters of the name of the food item and for directing the central processor to scroll forward or backward alphabetically for food item names respectively succeeding or preceding the selected food item while displaying on said display means, input/output means connected to the computer means for sending data from the central processor unit to said display means and for receiving request from the request means and for routing such request to the central processor unit, weighing means for providing a weighing signal to the central processor unit corresponding to the mass of an item being weighed, memory means connected to the computer means for containing data corresponding to food items and their nutrient levels and including instruction means for the central processor unit to correlate the weighing signal with data for a food item or items requested from the request means and providing a determination of the mass thereof of the display means.

* * * * *